United States Patent
Wagner et al.

(10) Patent No.: US 10,538,393 B2
(45) Date of Patent: Jan. 21, 2020

(54) TRANSPORT DEVICE AND METHOD FOR CONTROLLING AND MONITORING THE ELONGATION OF A TRANSPORT DEVICE

(71) Applicant: KHS GmbH, Dortmund (DE)

(72) Inventors: Stefan Wagner, Kleve (DE); Andreas Linder, Witten (DE); Dominik Thiesing, Hamminkeln (DE); Thomas Lelie, Kleve (DE); Josef Düpper, Bedburg-Hau (DE); Reinhard Wilzeck, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/099,253

(22) PCT Filed: May 24, 2017

(86) PCT No.: PCT/EP2017/062674
§ 371 (c)(1),
(2) Date: Nov. 6, 2018

(87) PCT Pub. No.: WO2017/220281
PCT Pub. Date: Dec. 28, 2017

(65) Prior Publication Data
US 2019/0210813 A1    Jul. 11, 2019

(30) Foreign Application Priority Data
Jun. 22, 2016 (DE) .................. 10 2016 111 421

(51) Int. Cl.
*B65G 43/10*    (2006.01)
*B65G 43/04*    (2006.01)
*B65G 23/44*    (2006.01)
*B65G 43/02*    (2006.01)

(52) U.S. Cl.
CPC ............. *B65G 43/10* (2013.01); *B65G 23/44* (2013.01); *B65G 43/02* (2013.01); *B65G 43/04* (2013.01)

(58) Field of Classification Search
CPC ........ B65G 43/00; B65G 43/02; B65G 43/04; B65G 43/10; B65G 23/44; B65G 2207/48
USPC ....................... 198/810.02, 810.04
See application file for complete search history.

(56) References Cited

U.S. PATENT DOCUMENTS

| | | | | |
|---|---|---|---|---|
| 4,729,468 A | * | 3/1988 | Pinck | A24C 5/1857 198/496 |
| 5,291,131 A | * | 3/1994 | Suzuki | G01B 7/042 324/206 |
| 5,563,392 A | | 10/1996 | Brown et al. | |
| 6,851,546 B2 | * | 2/2005 | Lodge | G01B 7/046 198/502.1 |

(Continued)

FOREIGN PATENT DOCUMENTS

| | | |
|---|---|---|
| DE | 4115327 | 11/1992 |
| DE | 19643997 | 5/1998 |

(Continued)

*Primary Examiner* — James R Bidwell
(74) *Attorney, Agent, or Firm* — Occhiuti & Rohlicek LLP

(57) ABSTRACT

An apparatus for transporting containers or packs of containers includes an endlessly circulating belt driven by a drive. A mark marks a position on the belt and a sensor detects the mark. A controller receives data from the drive's rotation-angle detector and from the sensor. It then uses this data to either determine an extent to which the belt has elongated or to control the drive.

25 Claims, 1 Drawing Sheet

(56) References Cited

U.S. PATENT DOCUMENTS

| | | | | |
|---|---|---|---|---|
| 7,275,637 | B2* | 10/2007 | Brown | B65G 43/02 |
| | | | | 198/502.1 |
| 9,222,861 | B2* | 12/2015 | Urbanzyk | B65G 43/02 |
| 2013/0341156 | A1* | 12/2013 | Vogeley, Jr. | B26D 5/007 |
| | | | | 198/340 |
| 2014/0102212 | A1* | 4/2014 | Urbanzyk | B65G 43/02 |
| | | | | 73/828 |
| 2014/0336812 | A1* | 11/2014 | Rathmann | B65G 43/02 |
| | | | | 700/213 |

FOREIGN PATENT DOCUMENTS

| | | |
|---|---|---|
| DE | 102004041705 | 3/2005 |
| DE | 11 2004 001 238 | 6/2006 |
| DE | 60 2004 006 459 | 1/2008 |
| DE | 10 2010 043057 | 5/2012 |
| EP | 1 850 087 | 10/2007 |

\* cited by examiner

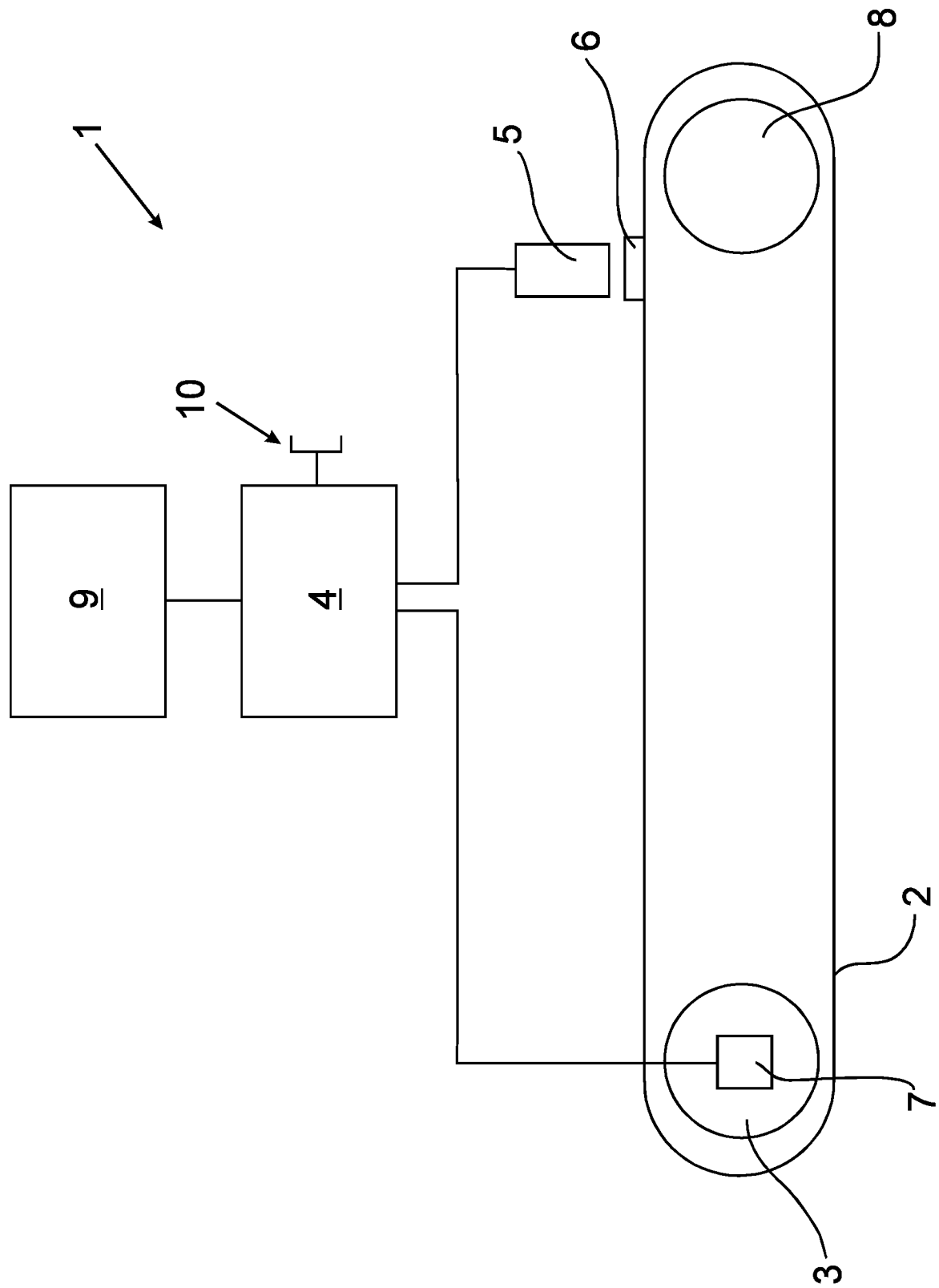

TRANSPORT DEVICE AND METHOD FOR CONTROLLING AND MONITORING THE ELONGATION OF A TRANSPORT DEVICE

RELATED APPLICATIONS

This application is the national stage under 35 USC 371 of international application PCT/EP2017/062674, filed on May 24, 2017, which claims the benefit of the Jun. 22, 2016 priority date of German application DE 102016111421.9, the content of which is herein incorporated by reference.

FIELD OF INVENTION

The invention relates to conveyors for transporting containers and in particular to preventive maintenance of such conveyors.

BACKGROUND

Conveyor belts are often used to transport containers. A typical conveyor belt is an endless loop that circulates between a drive roller and a deflection roller.

It is often useful to know how fast containers move along the conveyor belt. In principle, this should be a simple problem that depends on the drive speed and the belt's length. However, this is complicated by the fact that the length of the belt changes over time. These changes are either uniform over the belt or local, as a result of variations in material properties or environmental factors.

These changes in belt length that result from elongation lead to malfunctions and the need to carry out preventive maintenance.

Another disadvantage of having the belt change its length arises from a conveyor's interaction with other systems. In many cases, a conveyor feeds containers to other processing machines, all of which assume a particular belt speed. Thus, if the conveyor's belt speed changes, a machine that picks up containers from the container will find itself trying to pick up a container that has not yet arrived.

SUMMARY

In one aspect, the invention features a transport device for transporting objects. Such a conveyor has an endlessly circulating transport element, a driver for driving the circulating transport element, a controller for controlling the drive, and at least one stationary sensor for sensing at least one position of the transport element. The invention further relates to a method for controlling and monitoring a transport device.

As used herein, the term "objects" includes either containers or packs of containers.

As used herein, "containers" include bottles, cans, or kegs made of metal, glass, plastic, and/or a composite material.

As used herein, a pack of containers, sometimes called a "multi-pack," refers to an arrangement of at least two containers, preferably at least four, and in many cases six containers, that have been arranged in a spatially predetermined position in relation to one another. In some embodiments, an adhesive bond connects containers to each other. However, in other embodiments, a further element provides a connection between containers.

In one aspect, the invention features an apparatus for transport of objects. Such an apparatus includes an endlessly circulating belt, a drive for driving the circulating belt, a controller for controlling the drive, and at least one stationary sensor for detecting at least one position mark of the belt. The drive comprises a rotation-angle detector that outputs a position or setting. The controller receives data from the rotation-angle detector and the sensor. The controller then uses this data in connection with one or both of two tasks: the task of determining an extent to which the belt has elongated and the task of regulating the drive.

The term "speed" will be used throughout in connection with the belt. The belt features a surface that conveys objects along a conveying direction. For a given point on this surface, the position of that point changes with time as the belt circulates. The rate of change of that point's position with respect to time is the "speed" of the belt. It should be noted that the speed of the belt is not necessarily constant at all points.

The term "circulation" is also used in connection with the belt. This is intended to describe the fact that for any spatial coordinate through which a point passes, that point will eventually return to that spatial coordinate. The term "circulation" is used for the belt rather than "rotation" since the point does not traverse a circular path. The duration of time between two successive arrivals at a point is the "circulation period."

One way to determine a belt's speed is to detect a mark on a belt with a first sensor and then detect the same mark with a second sensor downstream of the first sensor. The known difference between the sensors and the elapsed time provides an estimate of average speed between the sensors.

An alternative way to measure speed dispenses with the second sensor.

Instead of two sensors, one can use a sensor and a rotation-angle detector arranged in the drive. The absence of a second sensor along the belt simplifies structural arrangement and results in savings on manufacturing costs. Some embodiments integrate the rotation-angle detector into the drive's interior of the drive thus rendering it less susceptible to interfering influences. This promotes more precise and reliable operation.

In another aspect, the invention features a method for controlling and monitoring a conveyor having an endlessly circulating belt and a stationary sensor for detecting a position mark of the belt as a drive drives the belt and a rotation-angle detector indicates the drive's rotation angle.

Such a method includes using the rotary-angle detector to detect a first rotation angle and storing it as a reference rotation angle, or "reference angle." The method continues with detecting the marker again and determining at least one further rotation angle based on this detection. The controller then receives this and uses it to carry out either one or both of a first task and a second task. The first task is that of regulating the drive's speed. The second task is that of determining that the belt has become elongated and, optionally, determining an extent to which it has been elongated.

The method thus accommodates the occurrence of frictional effects in a region of the belt and in particular, a change in length resulting from such frictional effects. If the belt becomes longer, the marker reaches the sensor later. This means that the rotation angle at which the marker reaches the sensor will not match the reference angle, the latter having been obtained prior to elongation when the belt was still new.

In some embodiments, the apparatus adjusts the belt's speed by adjusting the drive's acceleration so that the belt's speed remains constant over the entire duration of operation. This is particularly important if one wishes to transfer an object to or from the belt. Such transfers often occur between one belt and another belt or between the belt and a transport star. A failure to properly regulate speed under these circumstances could lead not to undesirable forces being exerted on the container or the multi-pack. These forces can rotate the container or multi-pack, and thereby rendering the following work steps more difficult.

In particular embodiments, the transport device that carries the objects is a belt.

The belt includes any component or module that is suitable for transport of containers or multi-packs as they stand or lie on sections of the belt. In some embodiments, the belt is a transport belt. In others, it is a transport chain.

The belt can be a plastic belt, a rubber belt, or a fabric belt. Or it can me made of a combination of the foregoing materials. In some embodiments, the material from which the belt is made comprises a fiber reinforcement or an embedded reinforcement fabric. In some embodiments, the belt is a single piece. In others, the belt is a chain made from identical chain links that are made of metal or plastic.

In some embodiments, the belt is an endlessly circulating belt. In such embodiments, the belt does not have an end in one spatial direction, and in particular, the spatial direction that matches that of the conveyor's direction of transport. The belt has the property that after a complete revolution, a point on the belt is at the same spatial position. In other words, for each point on the belt, the location of that point in space is a periodic function with a period equal to the time it takes the belt to engage in one circulation.

To implement the above periodic function, the conveyor includes two deflectors, one at each end thereof. One deflector connects to the drive and is thus driven. The other deflector, which is at the other end, is a freewheeling roller. These will be referred to as the "drive roller" and "deflection roller" respectively. In one embodiment, the drive roller is at one end of the belt and the deflection roller is at the other end of the belt.

In some embodiments, the drive includes a motor, transmission units, axles, and deflection or drive rollers. The drive's motor includes a rotation-angle detector that outputs the rotation angle of the drive. In some embodiments, the motor is an electromagnetic drive. In a particularly preferred embodiment, the motor is a servomotor with an integrated rotation-angle detector. The servomotor is preferably not one that is adjusted in discrete steps but rather one that is adjustable continuously so that the adjustment space is a continuum of adjustments.

A rotation-angle detector is a device for outputting the position of the driver, and in particular, the position of the driver's output axle or the position of the belt's drive axle. In some embodiments, the rotation-angle detector is a sensor that detects or measures the value of a rotation angle. In some embodiments, the rotation angle detector is an incremental detector for detecting a change in angle. A useful implementation relies on detecting the sense of a digital endless potentiometer.

Embodiments of a rotation-angle detector include those that obtain angle measurements by photoelectric scanning, using a sliding contact, those that do so by magnetic scanning, and those that do so by using a cogwheel sensor.

The output of the rotation-angle detector is either the value of the rotation angle itself or data from which that value can be determined. As an example, in those cases in which the rotation-angle detector counts increments, the output would be the number of increments. The processor could easily convert the number of increments into a rotation angle based in part on knowledge of how many increments there are per degree of rotation.

In a typical embodiment, the controller is a data-processing system that is suited for recording and storing data received from multiple sensors, and in particular, from the sensor that senses the mark and from the rotary-angle detector. In some embodiments, the controller is a memory-programmable controller, such as a programmable logic controller. Such a controller can be programmed to control the drive and to also calculate the elongation of the belt.

It is useful for the controller to have some kind of interface to receive programming instructions. This could be a user interface or an interface for connecting to a device that comprises a user interface. In some embodiments, the controller comprises a further interface for coupling to a further controller.

In some embodiments, the controller is a digitally programmable device having a user interface through which programming can be carried out. Such a user interface can take the form of a keyboard or touchscreen for user input and a visual display for providing output to the user. An advantage of the touch screen is that it can be used for both receiving user input and displaying user output.

Other embodiments feature an additional interface for connection to a further data-processing system, such as a tablet or a computer, through which such programming can be carried out.

A variety of ways can be used to establish communication between the controller, the rotation-angle detector, and the sensor. In some embodiments, communication is wireless and in other cases it is via a fiber optic link or a conducting link. Wireless communication typically relies on radio-frequency waves and infrared waves. Fiber optic links typically rely on light. Conductive links typically rely on frequencies that are low enough to avoid being radiated.

It is not necessary for the sensor and the rotation-angle detector to connect directly to the controller. It is also possible for them to connect via a further component, such as an encoder, a transformer, or any structure that has properties of an encoder or a transformer.

The sensor that detects the mark's position can be a mechanical sensor, such as a switch. In such cases, the mark directly actuates the switch as it passes by. On the other hand, the sensor can also be a contactless sensor that detects the mark either optically or electromagnetically.

In the latter case, detection can be digital or analog in nature. For example, in some embodiments, the mark is considered to be have been detected when a value of a signal exceeds a threshold. In that case, the mark is detected only when it is within the sensor's measurement range. On the other hand, it is possible to use the magnitude of the received signal or the rate of change of that signal to detect the presence of the mark.

It is particularly useful for the sensor to be a stationary sensor. This can be achieved by securing the sensor to the apparatus. The sensor need only be stationary during actual operation. For example, it is quite possible for the sensor to be able to pivot away to facilitate cleaning in its vicinity. Preferably, the sensor is arranged so that it can be aligned or moved from place to place to accommodate different kinds of belts with different locations of the mark.

The mark is either a part of the belt or a separate component. In either case, the mark is one that the sensor reliably detects. In some embodiments, the mark lies on the belt's surface at a location that faces the sensor. This would normally place it on the side of the belt that receives containers. As such, it is useful to place the mark at the belt's edge, where it is unlikely to be covered up by any containers.

Embodiments differ in the frequency with which a controller provides either a control signal or calculates an elongation. In some embodiments, the controller receives sensor data and carries out its task immediately, whether it be controlling the drive or calculating the elongation. In others, the controller waits for some number of sensor readings before taking action. This is advantageous because it dilutes the effect of any spurious readings. Among these are embodiments in which the controller executes its task, after a specified number of sensor actuations, for example, after every tenth or one hundredth sensor actuation.

Control over when to store a reference angle can be carried out manually, for example by having the operator press a button on the user interface for re-setting. However, it is also convenient to have the reference angle be stored automatically whenever the belt is replaced. This can be carried out by having a sensor that detects when the belt has been replaced. In such cases, the controller is configured to wait for a pre-defined run-in period for the new belt and to determine the reference angle after that period.

Once the reference angle has been stored, the sensor detects the mark the controller compares that rotational angle to the reference angle. This takes place within the framework of a continuous determination of the rotation angle every time the sensor detects the mark. The controller thus takes into account belt wear and the influence of containers or multi-packs that are present on the belt.

In an alternative embodiment, the controller determines rotation angles at predetermined longer intervals of time, for example hourly, daily, or weekly.

In some embodiments, there is at most one sensor per belt. It is also preferred that there by precisely one position mark per belt. This means that the belt can be manufactured more easily. This is of particular importance given that the belt sustains considerable wear and therefore requires frequent replacement.

Other embodiments have identical sensors offset from each other. These identical sensors provide data to the controller. The controller uses the data provided by each sensor, together with the reference angle, to determine the elongation of different sections of the belt or to dynamically control the belt on a section-by-section basis.

Section-by-section control is useful because the mere fact that a belt has elongated by a certain amount does not mean that every section of the belt has elongated by the same amount. It is quite possible for some sections of a belt to elongate more than other sections. Such variations can arise from variations in the belt's thickness or composition. Such variations can also arise because of the manner in which the belt is loaded down by the objects that it transports, for example, how many there are, how much each weighs, and where they are placed on the belt during transport. This makes it possible to regulate speed and determine elongation even when the elongation is irregular and varies with location.

In such embodiments, it is particularly preferable that the sensors be arranged at opposite ends of the belt or on opposite sides of the belt. Preferably, the distances between adjoining sensors along the belt remains the same for all pairs of consecutive sensors. In either case, the controller compares the rotation angles thus determined with the reference angle.

An alternative embodiment features plural marks on the belt. A sensor detects these plural marks and uses the corresponding rotation angles to determine elongation on a section-by-section basis. This makes it possible to create a map showing elongation as a function of position on the belt.

For example, if the time required to traverse a gap between first and second sensors differs from the time required to traverse a between second and third sensors, one can infer that the latter gap is longer than the former, perhaps as a result of local elongation of the belt.

The apparatus includes a "drive side." A drive side is the entire extended part of the drive and preferably corresponds to about half the length of the belt. In a typical embodiment, the drive side is the extended part of the transport element between the drive and the deflection roller that is furthest distant from the drive.

A "drive-side length" characterizes the drive side. In the apparatus, there exists a distance between the sensor and the drive. In some embodiments, this distance is at least half of the driving-side length. In other embodiments, this distance is at least 80% of the driving-side length. In other embodiments, this distance is at least 90% of the driving-side length. In other embodiments, this distance is at least 95% of the driving-side length. As a result, it becomes possible to determine the elongation of and to regulate the speed of the part of the belt that has been loaded with containers or multi-packs.

In some embodiments, the distance between the sensor and the drive is as great as possible. In other embodiments, the distance between the sensor and the rotation-angle detector is made as great as possible.

According to a preferred embodiment, the belt has one or more marks formed thereon. This makes it easier to manufacture the belt. This also makes it easy to replace the belt easily and economically, In some embodiments, the mark mechanically actuates the sensor. In other embodiments, the mark is one that promotes contactless actuation of the sensor or registration by the sensor. Embodiments include those in which the mark is formed as one piece. Other embodiments include those in which the mark is secured to the transport element by being joined, for example with a joining material, or through a positive fit or through a non-positive fit.

In some embodiments, marks are almost but not quite the same. Examples include embodiments in which the marks have slightly different lengths. This makes it possible to unambiguously ascertain which is the zero position.

In alternative embodiments, the mark is part of the belt. Among these are embodiments in which the mark is a part of the belt's contour, texture, or structure. As an example, the mark can be part of a belt's seam, a cut out or opening, a molded-on projection, a colored section of the belt, a circulating tool or tool part, or any structure that has properties similar to those of the foregoing.

Other embodiments include a second belt. In some of these embodiments, the first belt's controller communicates with the second belt's controller. In others of these embodiments, the controller receives data from a rotation-angle detector or sensor associated with the second belt. This provides a way to synchronize the speeds of the two belts so as to ensure a smooth transfer of objects between the belts.

In other embodiments, first and second conveyors are arranged to permit transfer of objects from one to the other. Among these are embodiments in which a belt associated with the second conveyor and that associated with the first conveyor are parallel at least in a section thereof and preferably completely parallel. This makes it possible to rotate an object by having the two conveyors run at different speeds. It also makes it possible to avoid rotating the object by having the two conveyors run at the same speeds.

Among these embodiments are those in which both belts have are coplanar, those in which both belts have the same conveying direction, and those in which the belts are both coplanar and also convey along the same conveying direction. Among these embodiments are those in which one belt is directly behind the other.

Further embodiments include sensors that provide the controller with environmental information such as information concerning temperature and humidity and sensors that provide information concerning loading of the belt. These factors and others of similar nature are referred to as "cross-influences." Having the controller take into account these cross-influences improves the calculation of elongation and the ability to regulate belt speed.

In some embodiments, the controller regulates the speed of belts associated with other conveyors. This enables the belt speeds to be synchronized with each other. Such synchronicity promotes smooth transfer of objects from one belt to the other.

In further embodiments, there are several marks on the belt. In these embodiments, each mark yields a corresponding rotation angle. As a result, it is possible to determine the elongation of a section of belt between two marks.

A similar result can be achieved by using plural sensors arranged opposite the belt. As each sensor detects a mark, a corresponding rotation angle results. These can be compared with the reference angle to determine the elongation of a section defined by the distance is between two sensors using the time required for the mark to traverse that distance. This too permits estimation of an extent of elongation on a section-by-section basis that can then be used to regulate belt speed on a section-by-section basis.

Other embodiments feature cross-influence sensors. These provide information on such environmental conditions such as humidity or temperature. The controller then uses this information to correct its comparison of rotation angles for distortions introduced by such cross influences.

As an example, knowing about such cross influences makes it possible to correct for known thermal expansion and known changes in elasticity that may result from such cross influences. This is particularly important for determining elongation since mere thermal expansion should not trigger belt replacement. The use of cross influences to correct the comparison thus suppresses false alarms that would result in unnecessary interruption of operation and premature replacement of belts.

In some embodiments, the conveyor is a first conveyor that is connected to a second conveyor with its own separate belt. In such embodiments, the controller receives data concerning the rotation angles of both its own belt and that of the second conveyor. This permits the controller to obtain information from which it is possible to determine elongation of both belts and to regulate speeds of both belts.

In some embodiments, an output interface displays the belt's elongation.

In other embodiments, the controller outputs a warning signal to indicate that the belt's elongation has exceeded some pre-defined value. Such a warning signal can be a visually prominent warning or an audible warning. Alternatively, an automatic stop halts operation when the belt's elongation has exceeded the pre-defined value.

An exemplary embodiment of the device according to the invention is explained in greater detail hereinafter, by reference to the drawing, in which:

BRIEF DESCRIPTION OF THE DRAWINGS

FIG. 1 shows a transport device.

DETAILED DESCRIPTION

FIG. 1 shows a conveyor 1 that transports objects. Examples of such objects are plastic bottles and multi-packs of such bottles. The conveyor 1 includes an endless transport belt 2 that circulates between a drive roller and a deflection roller 8. A drive 3 drives the belt 2. In doing so, the drive 3 relies on a servomotor having a controller 4 and a rotation-angle detector 7. The rotation-angle detector 7 continuously provides, to the controller 4, data indicative of a setting position. Based in part on this data, the controller 4 regulates the speed of the servomotor and does so continuously, rather than in discrete steps.

In some embodiments, the belt 2 carries a mark 6 on a surface thereof. In other embodiments, the belt 2 integrates the mark 6 into its interior. In yet other embodiments, the mark 6 comprises separate pieces that are inductively detectable. In alternative embodiments, the mark 6 is a tool or a part of a tool. An example of such a tool or tool part is a guide finger or a shaping finger.

A sensor 5 is aligned with the transport belt 2 just upstream of the deflection roller 8 at the end furthest from the drive 3 to detect the mark 6 as it goes by. The sensor 5 sends, to the controller 4, information indicative of having detected the mark 6.

In a typical embodiment, the controller 4 is a programmable processor-based device that has a user interface 9 and a programming interface 10. The user interface 9 provides a way for a user to control operation of the device and to receive output from the controller 4. The programming interface 10 provides coupling between the controller 4 and another device, such as another controller or an external device. A controller's ability to couple to other controllers is particularly useful when there are multiple transport belts 2 located either behind one another or parallel to one another.

The controller 4 provides a way to monitor the elongation or lengthening of the belt 2 that naturally occurs during use and to announce, on the user interface 9. In some embodiments, the user interface 9 continuously displays the extent of such elongation.

Upon installation of a new belt 2, the sensor 5 detects the mark 6 and stores a value of rotation angle provided by the rotation-angle detector 7 at that instant. This controller 4 relies on this value as a reference value in subsequent calculations.

In subsequent operation, when the sensor 5 again detects the mark 6, the controller 4 receives another value of rotation angle from the rotation-angle detector 7 at that instant. The controller 4 then compares this with the stored reference value. The result of such a comparison indicates elongation of the belt 2.

As the belt 2 elongates, the mark 6 reaches the sensor 5 progressively later. As a result, the associated rotation angle changes with elongation. Based on this difference and the geometry of the apparatus, the controller 4 calculates the extent of elongation. The resolution with which this can be calculated depends on the resolution of the rotation-angle detector 7, the number of motor revolutions required to complete one circulation of the transport belt 2, and the length of the transport belt 2.

The same data that permits the controller 4 to monitor the belt 2 for signs of elongation also provides a way to dynamically regulate its speed. The same comparison between the stored value and the measured value provided by the rotation-angle detector 7 reveals the speed of the belt 2 in relation to that of the drive 3. In particular, the belt's elongation causes the belt 2 to slow down while the rotating speed of the drive's drive roller stays the same. To ensure that the belt 2 moves at a consistent speed, the controller 4 adjusts the drive's speed of in response to elongation of the belt 2.

The need to regulate the drive 3 can arise from causes other than the belt's elongation due to wear and age. The belt 2, after all, carries objects with mass. The load from these objects also affects the belt's speed.

Fortunately, the same mechanism described above for monitoring the transport belt 2 and having the controller 4 calculate its relative speed makes it possible to dynamically control the drive 3 to maintain a consistent speed of the transport belt 2 even under different loading conditions.

Having described the invention, and a preferred embodiment thereof, what is claimed as new and secured by Letters Patent is:

1. An apparatus for transporting objects selected from the group consisting of containers and packs of containers, said apparatus comprising a belt, a drive, a controller, a sensor, a mark, and an angle detector, wherein said belt is an endlessly-circulating belt, wherein said drive drives said belt, and wherein said controller controls said drive, wherein said mark marks a position on said belt, wherein said sensor detects said mark, wherein said drive comprises said angle detector, wherein said controller receives data from said rotation-angle detector and said sensor, and wherein said controller is configured to carry out a task selected from the group consisting of a first task and a second task, wherein said first task is that of calculating, based at least in part on said data, an extent to which said belt has elongated, wherein said second task is that of controlling said drive based at least in part on said data, and wherein a switching tag secured to said belt forms said mark.

2. The apparatus of claim 1, wherein there exists no more than one sensor per belt.

3. The apparatus of claim 1, wherein there exists no more than one mark per belt.

4. The apparatus of claim 1, wherein said sensor is a first sensor, wherein said apparatus comprises a second sensor that is identical to said first sensor, wherein said first and second sensors are offset relative to each other along said belt, wherein said first and second sensors interact with said controller such that said controller processes data from each sensor with data from said rotary-angle detector to permit execution of said task for a designated section of said belt.

5. The apparatus of claim 1, wherein said task is said first task.

6. The apparatus of claim 1, wherein said task is said second task.

7. An apparatus for transporting objects selected from the group consisting of containers and packs of containers, said apparatus comprising a belt, a drive, a controller, a sensor, a mark, and an angle detector, wherein said belt is an endlessly-circulating belt, said drive drives said belt, and said controller controls said drive, wherein said mark marks a position on said belt, wherein said sensor detects said mark, wherein said drive comprises said angle detector, wherein said controller receives data from said rotation-angle detector and said sensor, and wherein said controller is configured to carry out a task selected from the group consisting of a first task and a second task, wherein said first task is that of calculating, based at least in part on said data, an extent to which said belt has elongated, wherein said second task is that of controlling said drive based at least in part on said data, and wherein said belt is a first belt and said controller is a first controller, wherein said apparatus further comprises a second belt and a second controller that controls said second belt, wherein said first and second controllers cooperate to synchronize speeds of said first and second belts.

8. The apparatus of claim 7, wherein said first and second belts are arranged such that said objects are transferred from said first belt to said second belt.

9. The apparatus of claim 7, wherein said first and second belts are arranged such that there exists a section of said first belt and a section of said second belt that are parallel to each other.

10. The apparatus of claim 7, wherein there exists no more than one sensor per belt.

11. The apparatus of claim 7, wherein said sensor is a first sensor, wherein said apparatus comprises a second sensor that is identical to said first sensor, wherein said first and second sensors are offset relative to each other along said belt, wherein said first and second sensors interact with said controller such that said controller processes data from each sensor with data from said rotary-angle detector to permit execution of said task for a designated section of said belt.

12. The apparatus of claim 7, wherein said task is said first task.

13. The apparatus of claim 7, wherein said task is said second task.

14. An apparatus for transporting objects selected from the group consisting of containers and packs of containers, said apparatus comprising a belt, a drive, a controller, a sensor, a mark, an angle detector, and a cross influence sensor that provides information indicative of a cross influence to said controller, wherein said belt is an endlessly-circulating belt, said drive drives said belt, and said controller controls said drive, wherein said mark marks a position on said belt, wherein said sensor detects said mark, wherein said drive comprises said angle detector, wherein said controller receives data from said rotation-angle detector and said sensor, and wherein said controller is configured to carry out a task selected from the group consisting of a first task and a second task, wherein said first task is that of calculating, based at least in part on said data, an extent to which said belt has elongated, wherein said second task is that of controlling said drive based at least in part on said data.

15. The apparatus of claim 14, wherein said sensor and said drive are separated by a distance and wherein said distance is at least 95% of the length of a drive side of said belt.

16. The apparatus of claim 14, wherein there exists no more than one sensor per belt.

17. The apparatus of claim 14, wherein there exists no more than one mark per belt.

18. The apparatus of claim 14, wherein said sensor is a first sensor, wherein said apparatus comprises a second sensor that is identical to said first sensor, wherein said first and second sensors are offset relative to each other along said belt, wherein said first and second sensors interact with said controller such that said controller processes data from each sensor with data from said rotary-angle detector to permit execution of said task for a designated section of said belt.

19. The apparatus of claim 14, wherein said task is said second task.

20. The apparatus of claim 14, wherein said task is said first task.

21. A method comprising controlling and monitoring a conveyor that comprises an endlessly circulating belt that is driven by a drive and that includes a rotation-angle detector and a stationary sensor for detecting a mark on said belt, wherein controlling and monitoring said conveyor comprises detecting said mark, storing a first reference rotation angle that is associated with detection of said mark, determining a second rotation angle that is associated with said mark's position, determining that said first and second rotation angles differ from each other, and, based at least in part on said difference, executing a task selected from a first task and a second task, wherein said first task comprises determining an extent to which said belt has elongated and wherein said second task comprises regulating said drive's speed, wherein said belt is a first belt and wherein said method further comprises receiving data indicative of a rotation angle of an additional belt and using said data to regulate said first belt so as to adjust said second belt.

22. The method of claim 21, further comprising regulating said belt's speed and regulating a further belt's speed.

23. The method of claim 21, further comprising detection an additional mark, obtaining a rotation angle associated with said additional mark, and wherein executing said task comprises executing said task based at last in part on said rotation angle associated with said additional mark.

24. The method of claim 21, wherein executing said task comprises executing said task based at last in part on a comparison between rotation angles derived from measurements by plural sensors opposite said belt and corresponding reference rotation angles.

25. The method of claim 21, further comprising, concurrently with determining said rotation angle, using an additional sensor to detect a cross-influence and wherein determining that said first and second rotation angles differ from each other comprises correcting a comparison between said first and second rotation angles based at least in part on said cross-influence.

* * * * *